United States Patent [19]

Huebner

[11] 3,759,927
[45] Sept. 18, 1973

[54] B-BENZOFURYLMETHYL-1,3,8-TRIAZASPIRO(4,5)DECANES
[75] Inventor: Charles Ferdinand Huebner, Chatham, N.J.
[73] Assignee: Ciba-Geigy Corporation, Ardsley, N.Y.
[22] Filed: Nov. 10, 1971
[21] Appl. No.: 197,475

Related U.S. Application Data
[63] Continuation-in-part of Ser. No. 183,694, Sept. 24, 1971, which is a continuation-in-part of Ser. No. 105,126, Jan. 8, 1971, abandoned.

[52] U.S. Cl. 260/293.58, 260/293.66, 260/346.2 R, 424/267
[51] Int. Cl. C07d 49/34
[58] Field of Search 260/293.58

[56] References Cited
UNITED STATES PATENTS
3,238,216  3/1966  Janssen ............................ 260/293.4

Primary Examiner—Henry R. Jiles
Assistant Examiner—G. Thomas Todd
Attorney—Joseph G. Kolodny et al.

[57] ABSTRACT

8-[1-(2,3-dihydro-2-benzofuryl)-alkyl]-1,3,8-triazaspiro(4,5)decanes, e.g. those of the formula

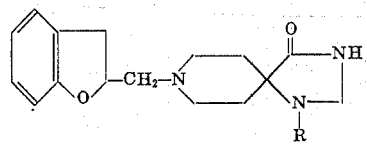

R=H, aliphatic, araliphatic or aromatic radical or functional derivatives thereof are neuroleptic agents.

7 Claims, No Drawings

B-BENZOFURYLMETHYL-1,3,8-TRIAZASPIRO(4,5)DECANES

CROSS-REFERENCES TO RELATED APPLICATIONS

This is a continuation-in-part of application Ser. No. 183,694, filed Sept. 24, 1971, which in turn is a continuation-in-part of application Ser. No. 105,126, filed January 8, 1971 now abandoned.

BACKGROUND OF THE INVENTION

Pursuant to the discovery of the hypotensive N-[1-(2,3-dihydro-2-benzofuryl)-alkyl]-piperazines, described in my U.S. Pat. Nos. 3,459,860 and 3,470,185, and related 1-(2,3-dihydro-2-benzofuryl)-alkyl compounds with vasodilating activity, there was generated a new class of compounds herein described, which members surprisingly do not exhibit hypotensive effects but, instead, marked central nervous system depressant activity. Their spectrum of pharmacological properties is quite different from that exhibited by the "substituted 1,3,8-triaza-spiro(4,5)decanes" disclosed in U.S. Pat. No. 3,238,216, which still exhibit "vasodilating activity."

SUMMARY OF THE INVENTION

The present invention concerns and has for its object the provision of new 8-[1-(2,3-dihydro-2-benzofuryl)-alkyl]-1,3,8-triazaspiro(4,5)decanes, more particularly of those corresponding to Formula I

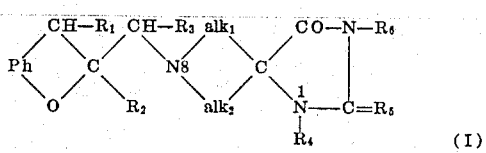

(I)

wherein Ph is a 1,2-phenylene radical, each of $R_1$, $R_2$ and $R_3$ is hydrogen or lower alkyl, each of $alk_1$ and $alk_2$ is lower alkylene separating the nitrogen atom from the spiro-carbon atom by two ring-carbon atoms, $R_4$ is hydrogen, an aliphatic, araliphatic or aromatic radical, $R_5$ is two hydrogens, hydrogen and lower alkyl or oxo, and $R_6$ is hydrogen, lower alkyl or lower hydroxyalkyl, of acyl derivatives, N-oxides, quaternaries or salts thereof, of corresponding pharmaceutical compositions and of methods for the preparation and application of these products, which are useful neuroleptics, for example, in the treatment or management of agitation, aggression, anxiety or hysteria in warm-blooded animals. Thus, when administered to them in effective dosages and suitable application forms, they facilitate their handling, e.g. during shipment, due to the reduction of their spontaneous motor activity.

DESCRIPTION OF THE PREFERRED EMBODIMENTS

The 1,2-phenylene radical Ph in Formula I is unsubstituted or substituted by one or more than one, preferably by one or two of the same or of different substituents attached to any of the positions available for substitution. Such substituents are, for example, lower alkyl, e.g. methyl, ethyl, n- or i-propyl or -butyl; free, etherified or esterified hydroxy, mercapto or lower hydroxy-alkyl, preferably α-hydroxyalkyl, such as lower alkoxy, alkylene-dioxy, alkylmercapto, halogeno, lower (hydroxy, alkoxy, mono-, di- or trihalo)-alkyl, e.g. methoxy, ethoxy, n- or i-propoxy or -butoxy; methylenedioxy; methyl- or ethylmercapto; fluoro, chloro or bromo; (hydroxy, methoxy, chloro or trifluoro)-methyl, 1- or 2-(hydroxy, methoxy or chloro)-ethyl or 1-hydroxy-2-methylpropyl; nitro; amino or di-lower alkylamino, e.g. dimethylamino or diethylamino; or acyl, such as lower alkanoyl, lower alkylsulfinyl or -sulfonyl, e.g. acetyl, propionyl or butyryl; methyl- or ethylsulfinyl or -sulfonyl. The term "lower," referred to above or hereinafter in connection with organic radicals or compounds respectively, defines such with up to 7, preferably up to 4, carbon atoms.

Preferred radicals Ph are 1,2-phenylene, (lower alkyl)-1,2-phenylene, (hydroxy)-1,2-phenylene, mono- or di-(lower alkoxy)-1,2-phenylene, (lower alkylenedioxy)-1,2-phenylene, (lower alkylmercapto)-1,2-phenylene, (halogeno)-1,2-phenylene, (lower α-hydroxy-alkyl)-1,2-phenylene, (trifluoromethyl)-1,2-phenylene, (nitro)-1,2-phenylene, (amino)-1,2-phenylene, (di-lower alkylamino)-1,2-phenylene, (lower alkanoyl)-1,2-phenylene, (lower alkylsulfinyl)-1,2-phenylene or (lower alkylsulfonyl)-1,2-phenylene.

Each of the radicals $R_1$, $R_2$, $R_3$, $R_5$ and $R_6$ represent preferably hydrogen, but also lower alkyl, e.g. that mentioned above, especially methyl, or, in case of $R_5$, hydrogen and lower alkyl, e.g. methyl.

The lower alkylene radicals $alk_1$ and $alk_2$ stand preferably for 1,2-ethylene, but also for 1,2-propylene, 1,2- or 2,3-butylene.

An aliphatic radical $R_4$ is, for example, lower alkyl, e.g. that mentioned above, lower alkenyl or alkynyl, e.g. allyl, methallyl, 2- or 3-butenyl; propargyl, 2- or 3-butynyl; lower cycloalkyl, cycloalkenyl, cycloalkyl-lower alkyl or cycloalkenyl-lower alkyl, e.g. cyclopropyl, cyclopentyl, cyclohexyl; 2-cyclopentenyl or -cyclohexenyl; cyclopropylmethyl, cyclobutylmethyl or 2-cyclopentylethyl; cyclopent-2-enylmethyl or cyclohex-3-enylmethyl.

An araliphatic or aromatic radical $R_4$ is preferably represented by $H-Ph-C_nH_{2n}-$, wherein Ph has the above-given meaning and n is an integer from 0 to 4, preferably 0 or 1.

A lower hydroxyalkyl radical $R_6$ is preferably hydroxymethyl, 1- or 2-hydroxyethyl, but also, 1-, 2- or 3-hydroxypropyl or -butyl.

Acyl derivatives are preferably derived from a) the compounds of Formula I, in which $R_4$ and/or $R_6$ is hydrogen, or Ph or $R_6$ contain hydroxy, mercapto or amino, and b) lower aliphatic, araliphatic or aromatic carboxylic acids, such as those corresponding to the formulae $C_nH_{2n+1}-COOH$ or $HPh-C_nH_{2n}-COOH$, wherein n and Ph have the meaning given above, e.g. acetyl, propionyl, pivaloyl, phenylacetyl or benzoyl derivatives.

N-oxides and quaternaries are derived from a) the compounds of Formula I, in which both $R_4$ and $R_6$ are different from hydrogen and Ph is different from (amino)-1,2-phenylene; and the quaternaries b) from lower alkyl halides, sulfates or sulfonates, e.g. lower alkylammonium chlorides, iodides, sulfates, methane- or p-toluenesulfonates.

Salts of the compounds of Formula I are preferably therapeutically acceptable acid addition salts derived, for example, from the inorganic or organic acids listed below.

The compounds of the invention exhibit valuable pharmacological properties, especially central nervous system depressant effects. This can be demonstrated in animal tests, using advantageously mammals, such as rats, mice, rabbits, cats, dogs and especially monkeys, as test objects. The compounds of the invention can be applied enterally or parenterally, e.g. orally, subcutaneously, intraperitoneally or intravenously, for example, within gelatin capsules, suspended in corn starch or in the form of aqueous solutions or suspensions respectively. The oral dosage may range in the lower animals, e.g. mice or rats, between about 0.1 and 200 mg/kg/day, preferably between about 1 and 50 mg/kg/day, and in the higher animals, e.g. dogs or monkeys, between about 0.1 and 10 mg/kg/day, preferably between about 0.3 and 2.5 mg/kg/day. Said compounds produce, for example, a quieting effect in mice, as demonstrated in the jiggle-cage or light-box test, where a reduction of their spontaneous motor activity is recorded after oral or subcutaneous doses as low as 2.5 mg/kg/day. At about 10 mg/kg/day orally, they antagonize for more than 4 hours the stimulating effects of amphetamine in rats, working (bar-pressing) in an operant electric shock avoidance situation. Analogously, they decrease at oral doses between about 0.1 and 10 mg/kg/day the lever-pressing avoidance responses of squirrel monkeys, i.e., the number of electric shocks taken by the animals increases with the dose applied (Sidman procedure). Intravenous administration of said compounds at a dose of about 2 mg/kg/day to rabbits induces a cataleptic-like state, from which the animals can be very easily aroused (unaltered righting reflex) and at doses of about 10 mg/kg/day i.v. no effect on the respiration is observed in anesthetized cats, but a depression of their flexor and patellar reflexes. Accordingly, the compounds of the invention are useful neuroleptics, for example, in the treatment or management of agitation, aggression or anxiety in warm-blooded animals, preferably mammals. They are also valuable intermediates of other preparations, preferably pharmacologically useful products.

Preferred compounds of the invention are those of Formula I, in which Ph is unsubstituted 1,2-phenylene or 1,2-phenylene substituted by up to two members of the group of lower alkyl, hydroxy, mercapto, lower alkoxy, lower alkylenedioxy, lower alkylmercapto, halogeno, lower (hydroxy, alkoxy, mono-, di- or trihalo)-alkyl, nitro, amino, di-lower alkylamino, lower alkanoyl, lower alkylsulfinyl or lower alkylsulfonyl, each of $R_1$, $R_2$ and $R_3$ is hydrogen or lower alkyl, each of $alk_1$ and $alk_2$ is lower alkylene separating the nitrogen atom from the spiro-carbon atom by two ring-carbon atoms, $R_4$ is hydrogen, lower alkyl, alkenyl, alkynyl, cycloalkyl, cycloalkenyl, cycloalkyl-lower alkyl, cycloalkenyl-lower alkyl or H-Ph-$C_nH_{2n}$-, wherein n is an integer from 0 to 4, $R_5$ is two hydrogens, hydrogen and lower alkyl or oxo, and $R_6$ is hydrogen, lower alkyl or hydroxy-lower alkyl, or a lower alkanoyl, HPh-lower alkanoyl or HPh-carbonyl derivative of said compounds in which $R_4$ and/or $R_6$ is hydrogen or Ph or $R_6$ contain hydroxy, mercapto or amino, the N-oxide or lower alkyl quaternaries of said compounds in which $R_4$ and $R_6$ are different from hydrogen and Ph is different from (amino)-1,2-phenylene, or therapeutically acceptable acid addition salts thereof.

Particularly useful are those compounds of Formula I, in which Ph is 1,2-phenylene, (lower alkyl)-1,2-phenylene, (hydroxy)-1,2-phenylene, mono- or di-(lower alkoxy)-1,2-phenylene, (lower alkylenedioxy)-1,2-phenylene, (lower alkylmercapto)-1,2-phenylene, (halogeno)-1,2-phenylene, (lower α-hydroxyalkyl)-1,2-phenylene, (trifluoromethyl)-1,2-phenylene, (nitro)-1,2-phenylene, (amino)-1,2-phenylene, (di-lower alkylamino)-1,2-phenylene, (lower alkanoyl)-1,2-phenylene, (lower alkylsulfinyl)-1,2-phenylene or (lower alkylsulfonyl)-1,2-phenylene, each of $R_1$, $R_2$ and $R_3$ is hydrogen or lower alkyl, each of $alk_1$ and $alk_2$ is lower alkylene separating the nitrogen atom from the spirocarbon atom by two ring-carbon atoms, $R_4$ is hydrogen, lower alkyl, 3 to 7 ring-membered cycloalkyl or cycloalkyl-lower alkyl or H-Ph-$C_nH_{2n}$-, wherein n is an integer from 0 to 4, $R_5$ is two hydrogens, hydrogen and lower alkyl or oxo and $R_6$ is hydrogen, lower alkyl or hydroxy-lower alkyl, or a lower alkanoyl derivative of said compounds in which $R_4$ and/or $R_6$ is hydrogen or Ph or $R_6$ contain hydroxy, mercapto or amino, the N-oxide or lower alkyl quaternaries of said compounds in which $R_4$ and $R_6$ are different from hydrogen and Ph is different from (amino)-1,2-phenylene, or therapeutically acceptable acid addition salts thereof.

More preferred are compounds of Formula II

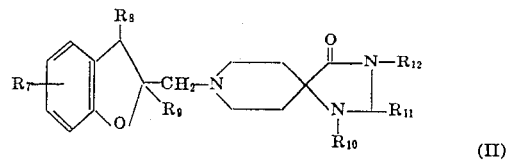

(II)

in which $R_7$ is hydrogen, lower alkyl, hydroxy, lower alkoxy, halogeno, lower α-hydroxyalkyl, trifluoromethyl or lower alkanoyl, each of $R_8$, $R_9$ and $R_{11}$ is hydrogen or lower alkyl, $R_{10}$ is lower alkyl, 3 to 7 ring-membered cycloalkyl or $R_7$-phenyl, and $R_{12}$ is hydrogen, lower alkyl, hydroxy-lower alkyl or lower alkanoyl, or lower alkyl quaternaries of said compounds in which $R_{12}$ is lower alkyl or hydroxy-lower alkyl, or therapeutically acceptable acid addition salts thereof.

Particularly valuable are those compounds of Formula II, in which $R_7$ is hydrogen, alkyl, hydroxy, alkoxy, halogeno, α-hydroxyalkyl, trifluoromethyl or alkanoyl, each of $R_8$, $R_9$ and $R_{11}$ is hydrogen or methyl and $R_{10}$ is methyl, cyclohexyl or $R_7$-phenyl, $R_{12}$ is hydrogen, methyl, hydroxymethyl or acetyl, and alkyl, alkoxy or alkanoyl contains up to 4 carbon atoms, or therapeutically acceptable acid addition salts thereof.

Especially valuable are the compounds of Formula II, in which $R_7$ is hydrogen, methyl, methoxy, fluoro, chloro, 1-hydroxyethyl, trifluoromethyl or acetyl, each of $R_8$, $R_9$, $R_{11}$ and $R_{12}$ is hydrogen or methyl and $R_{10}$ is $R_7$-phenyl, and of these especially the 1-phenyl-4-oxo-8-[5-methoxy- or 5-(1-hydroxyethyl)-2,3-dihydro-2-benzofurylmethyl]-1,3,8-triazaspiro(4,5)decane, or a therapeutically acceptable acid addition salt thereof, more particularly the optically levorotatory forms thereof, which exhibit outstanding effects in the above-described test systems, especially the Sidman procedure.

The compounds of the invention are prepared according to known methods, for example, by:

a. condensing a reactively converted 1-(2,3-dihydro-2-benzofuryl)-alkanol or an -alkylamine with an 8-unsubstituted 1,3,8-triazaspiro(4,5)decane or a reactively converted 5-bis-(2-hydroxyalkyl)-2,3-dihydro-4- imidazolone or a metal salt of said amines or imines, e.g. compounds of the formulae

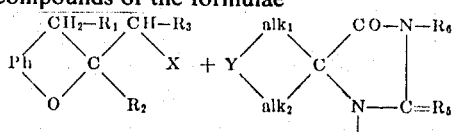

in which X is reactively esterified hydroxy or amino and Y is imino or two reactively esterified hydroxies, both X and Y together contain but one nitrogen atom or b. condensing a 1-[1-(2,3-dihydro-2-benzofuryl)-alkyl]-4-amino-hexahydroisonicotinamide with a reactive derivative of a lower alkanal, formic or carbonic acid, e.g. compounds of the formulae

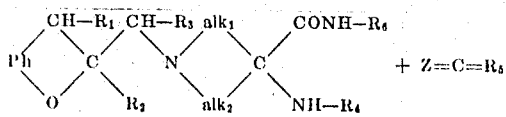

in which Z is oxo, hydrogen and amino or two reactively converted hydroxy or amino groups, both Z and $R_5$ together contain but one oxo, or c. reducing a dehydro- and/or hydroxy-derivative of an 8-[1-(2,3-dihydro-2-benzofuryl)-alkyl]-1,3,8-triazaspiro(4,5)decane, e.g. such of the formula

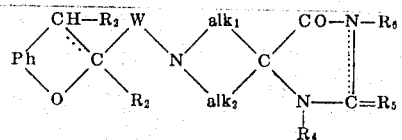

in which W is free or reactively converted

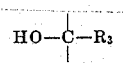

or it is

if at least one double bond extends from the 2-carbon atoms and, if desired, converting any resulting compound into another compound of the invention.

A reactively converted hydroxy group in the above starting materials is preferably a hydroxy group esterified with a strong mineral or sulfonic acid, e.g. sulfuric, methane-, ethane-, benzene-, p-toluene- or camphorsulfonic acid, but preferably that of a hydrohalic acid, e.g. hydrochloric or hydrobromic acid. Z may also represent hydroxy groups etherified with lower alkanols or glycols, e.g. methanol, ethanol or ethyleneglycol. In case it is reactively converted amino, e.g. if $R_5$ is oxo, Z may represent, for example, two imidazolyl groups. Metal salts of said amines or imines are preferably alkali metal, e.g. lithium, sodium or potassium salts.

The chemical processes of the present invention are carried out according to standard methods, e.g. in the presence or absence of diluents, preferably such as are inert to the reagents and are solvents thereof, of catalysts, condensing or reducing agents respectively and/or inert atmospheres, at low temperatures, room temperature or elevated temperatures, at atmospheric or super-atmospheric pressure. Condensing agents are advantageously used in the process mentioned under items a) and b). In case reactive esters or acid derivatives respectively are used, the condensing agents are preferably basic agents, for example, alkali or alkaline earth metal carbonates, hydroxides or lower alkoxides, such as sodium, potassium or calcium carbonate, sodium or potassium hydroxide, methoxide or ethoxide, but also organic nitrogen bases, such as aliphatic or aromatic tertiary amines, such as tri-lower alkylamines, e.g. triethylamine; pyridine or collidine. In case acetals are used in the condensation shown under item b), acidic agents are advantageously applied, e.g. the strong mineral or sulfonic acids mentioned above. A preferred condensation is that in which $Z = C = R_5$ is formamide. This reagent has to be applied in at least two mol equivalents, in order to obtain the compounds of Formula I, ammonia and carbon dioxide.

The reduction according to item c) is advantageously performed with the use of catalytically activated or nascent hydrogen, such as hydrogen in the presence of platinum, palladium or nickel catalysts or generated from alcohols or weak acids and metals, e.g. lower alkanols and light metals, such as alkali metals or amalgams thereof, or lower alkanoic acids and heavy metals, such as zinc, cadmium or iron. Also reducing agents may be used, advantageously, complex light metal hydrides, such as alkali metal aluminum or borohydrides, e.g. lithium aluminum hydride or sodium borohydride, if desired, in combination with a Lewis acid, e.g. aluminum chloride.

The compounds of the invention so obtained can be converted into each other according to known methods. For example, resulting compounds containing a primary or secondary amino group, can be reacted with a reactive ester of a corresponding alcohol, e.g. a lower alkanol, or can be acylated, for example, with a reactive functional derivative of a corresponding acid, such as a halide or anhydride thereof. Resulting acyl derivatives, e.g. esters or amides, can be hydrolyzed, for example, with the use of acidic or alkaline hydrolyzing agents, and ketones or amides also reduced to the corresponding α-hydroxyalkyl-1,2-phenylene or lower alkylamino or -imino compounds respectively, for example, with the use of complex light metal hydrides, e.g. sodium borohydride or lithium aluminum hydride respectively. Finally, resulting tertiary bases can be converted into N-oxides, preferably with the use of hydrogen peroxide or percarboxylic acids, such as peracetic or perbenzoic acid, or they can be quaternized, for example, with the use of lower alkyl halides or sulfonates, e.g. chlorides, bromides, iodides or p-toluenesulfonates.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically acceptable salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic or cyclohexylsulfamic acid; methionine, tryptophan, lysine or arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines mentioned above can be used in the form of their alkali metal salts. Mainly, those starting materials should be used in the process of the invention that lead to the formation of those compounds indicated above as being specially valuable.

The starting material used is known, or if new, may be prepared according to the methods illustrated by the examples herein or the literature cited. The 1-(2,3-dihydro-2-benzofuryl)-alkanol derivatives or -alkylamines, as well as the 1,3,8-triazaspiro(4,5)decanes are described in the patents cited in the beginning. The 5-bis-(2-hydroxyalkyl)-2,3-dihydro-4-imidazolones are analogously prepared as the latter, but chosing instead of the initial 4-piperidone, the corresponding open-chain free or esterified dihydroxy-alkanone, e.g. 1,5-dihydroxy-3-pentanone. This is reacted according to Strecker with ammonia or the corresponding amine and hydrocyanic acid, the resulting α-aminonitrile hydrolyzed to the corresponding amide, which is ring-closed analogous to the process shown under item b). The hexahydroisonicotinamides shown thereunder are analogously prepared from 1-benzyl-4-piperidones according to the Strecker synthesis, debenzylating the amide by hydrogenation and processing the resulting 1-unsubstituted amide analogous to a). A similar condensation is applied for the preparation of the compounds mentioned under item c). The double bond is advantageously introduced into the reactants, whereupon a condensation is performed with the dehydro-derivatives of the compounds shown under item a). Said dehydro-spiro-reactants are advantageously obtained by a ring-closing condensation analogous to b) but using, instead of the lower alkanal derivatives, reactive lower alkanoic acid derivatives, e.g. lower alkyl orthoesters or iminoesters. Finally the compounds with

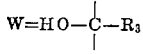

are obtained by the addition of 2-benzofurane-carboxaldehydes of -alkanones, or 2,3-dihydro derivatives thereof, to 8-unsubstituted 1,3,8-triazaspiro(4,5)decanes.

Starting materials or final products that are mixtures of isomers can be separated into the single isomers by methods in themselves known, e.g. by fractional distillation, crystallization and/or chromatography. Racemic products can likewise be resolved into the optical antipodes, for example by separation of diastereomeric salts or esters thereof, e.g. by the fractional crystallization of d- or l-tartrates, -maleates, -mandelates, -N-acetylphenyl-alaninates or -camphorsulfonates, and reconverting the diastereomeric salts or esters into the free antipodes, or using said esterintermediates direct in reaction a).

The pharmacologically active compounds of the invention are useful in the manufacture of pharmaceutical compositions comprising an effective amount thereof in conjunction or admixture with excipients suitable for either enteral or parenteral application. Preferred are tablets and gelatin capsules comprising the active ingredient together with a) diluents, e.g. lactose, dextrose, sucrose, mannitol, sorbitol, cellulose and/or glycine, b) lubricants, e.g. silica, talcum, stearic acid, its magnesium or calcium salt and/or polyethyleneglycol, for tablets also c) binders, e.g. magnesium aluminum silicate, starch paste, gelatin, tragacanth, methylcellulose, sodium carboxymethylcellulose and/or polyvinylpyrrolidone, if desired, d) disintegrants, e.g. starches, agar, alginic acid or its sodium salt, enzymes of the binders or effervescent mixtures and/or e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50 percent, of the active ingredient.

Preferred compositions for veterinary use are the parenterally, e.g. intravenously or intramuscularly, applicable solutions or suspensions. They may be applied prior to treating or causing painful conditions in the most preferred dosage range of about 0.3 to 2.5 mg/kg/day.

The following examples are intended to illustrate the invention and are not to be construed as being limitations thereon. Temperatures are given in degrees Centigrade, and all parts wherever given are parts by weight.

EXAMPLE 1

The mixture of 3.7 g of 2-bromomethyl-5-methoxy-2,3-dihydrobenzofuran, 3.6 g of 1-phenyl-4-oxo-1,3,8-triazaspiro(4,5)-decane, 6 g of anhydrous sodium carbonate and 50 ml of 2-propanol is refluxed for three days. The mixture is filtered and the filtrate evaporated under reduced pressure. The residue is crystallized by agitating vigorously with a mixture of 50 ml of diethyl ether and 50 ml of water. The product is recrystallized twice from ethanol to afford the 1-phenyl-4-oxo-8-(5-methoxy-2,3-dihydro-2-benzofurylmethyl)-1,3,8-triazaspiro(4,5)decane of the formula

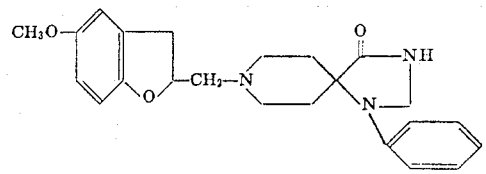

melting at 191°–192°.

The hydrochloride salt thereof is prepared by adding 6N ethanolic hydrogen chloride to an acetone solution of the above free base. The hydrochloride crystallizes out and melts at 290° with decomposition.

EXAMPLE 2

In an analogous manner to Example 1, 2.8 g of 2-bromomethyl-2,3-dihydrobenzofuran, 3.0 g of 1-phenyl-4-oxo-1,3,8-triazaspiro(4,5)decane and 6 g of anhydrous sodium carbonate in 40 ml of 2-propanol are refluxed for three days which affords on recrystallization from acetone-ethanol the 1-phenyl-4-oxo-8-(2,3-dihydro-2-benzofurylmethyl)-1,3,8-triazaspiro(4,5)decane, melting at 202°–205°.

EXAMPLE 3

2.7 g of 2-bromomethyl-5-fluoro-2,3-dihydrobenzofuran, 2.7 g of 1-phenyl-4-oxo-1,3,8-triazaspiro(4,5)decane and 5 g of anhydrous sodium carbonate in 45 ml of 2-propanol are treated as previously described in Example 1 to give the 1-phenyl-4-oxo-8-(5-fluoro-2,3-dihydro-2-benzofurylmethyl)-1,3,8-triazaspiro(4,5)-decane, melting at 188°–191° on recrystallization from ethanol.

The starting 2-bromomethyl-5-fluoro-2,3-dihydrobenzofuran is prepared as follows:

The mixture of 125 g of 4-fluorophenol, 300 ml of acetone, 160 g of potassium carbonate and 135 g of allyl bromide is refluxed for 8 hours and allowed to stand overnight. The mixture is diluted with 600 ml of water and the resulting layers separated. The aqueous layer is extracted with 2×450 ml of methylene chloride. The combined organic extracts are washed with 225 ml of 10 percent aqueous sodium hydroxide, dried, filtered and the filtrate evaporated to give the 1-allyloxy-4-fluorobenzene.

60 g thereof are heated under a nitrogen atmosphere to an internal temperature of 220° for 2-½ hours. On cooling, there is afforded the 2-allyl-4-fluorophenol.

The mixture of 60 g thereof and 102 g of acetic anhydride is refluxed for 3 hours. The acetic acid formed is removed under reduced pressure and the residue is distilled to afford the 1-acetoxy-2-allyl-4-fluorobenzene, boiling at 118°–121°/14 mm Hg.

The solution of 42 g of bromine in 120 ml of carbon tetrachloride is added dropwise to the solution of 51 g of the above acetylated phenol in 150 ml of carbon tetrachloride. The reaction mixture is stirred for 1-½ hours after the addition and then treated with 60 ml of saturated aqueous sodium carbonate and 100 ml of water. The organic layer on separation is dried, filtered and evaporated under reduced pressure to give the 1,2-di-bromo-3-(2 -acetoxy-5 -fluorophenyl)propane.

The solution of 15 g of sodium methoxide in 250 ml of ethanol is added dropwise to the solution of 90 g of the above dibromopropane in 125 ml of ethanol. The reaction mixture is refluxed for 2 hours, filtered and the filtrate evaporated under reduced pressure. The residue is diluted with water and extracted with methylene chloride. The methylene chloride extract is dried and filtered; the filtrate is evaporated. The residue is distilled to afford the 2-bromomethyl-5-fluoro-2,3-dihydrobenzofuran, boiling at 135°–139°/15 mm Hg.

EXAMPLE 4

The mixture of 1.1g of 2-bromomethyl-5-methoxy-1,2-dihydrobenzofuran, 1.1 g of 1-cyclohexyl-4-oxo-1,3,8-triazaspiro-(4,5)decane, 3 g of sodium carbonate and 25 ml of 2-propanol is refluxed for 3 days. The salts are filtered off and the filtrate evaporated under reduced pressure. The residue is treated with a mixture of 50 ml of diethyl ether and 50 ml of water. The ether layer is separated and extracted with aqueous citric acid. The combined acid fractions are made basic with ammonium hydroxide and extracted with diethyl ether. The ether extracts are dried and evaporated. The residue is recrystallized from ethanol to give the 1-cyclohexyl-4-oxo-8-(5-methoxy-2,3-dihydro-2-benzofurylmethyl)-1,3,8-triazaspiro(4,5)decane, melting at 155°–156°.

EXAMPLE 5

To the solution of 50 g of d,l-1-phenyl-4-oxo-8-(5-methoxy-2,3-dihydro-2-benzofurylmethyl)-1,3,8-triazaspiro(4,5)decane (obtained according to Example 1) in 1.8 lt. of acetone, the solution of 26.4 g of N-acetyl-l-phenylalanine in 350 ml of acetone is added while stirring and the mixture concentrated to about 1.5 lt. It is allowed to stand overnight in the refrigerator, and the precipitate formed filtered off, to yield the salt A, m.p. 103°–105° (dec). The mother liquor is further concentrated to about 800 ml, and the precipitate formed in the cold filtered off, to yield the salt B, m.p. 90°–105°.

31 g of the salt A is recrystallized from 325 ml of ethanol containing 6 ml of water, 26 g of the recovered material recrystallized from 325 ml of ethanol containing 4 ml of water and 24.5 g of the recovered material recrystallized from 450 ml of ethanol. The purified salt is taken up in water, the mixture made basic with aqueous ammonia and extracted with chloroform. The extract is dried and evaporated, to yield the l-1-phenyl-4-oxo-8-(5-methoxy-2,3-dihydro-2-benzofurylmethyl)-1,3,8-triazaspiro-(4,5)decane, melting at 185°–188°, $[\alpha]_D = -12.4°$ (chloroform).

The salt B is taken up in water, the mixture made basic with aqueous ammonia and extracted with chloroform. The extract is dried and evaporated. 18.1 g of the residue are taken up in 450 ml of acetone and the solution combined with that of 9.55 g N-acetyl-d-phenylalanine in 180 ml of acetone. The mixture is concentrated to about 500 ml and 21 g of the precipitate formed in the cold recrystallized first from 400 ml of ethanol containing 2 ml of water. 17 g of the recovered material is recrystallized from 300 ml of ethanol and the resulting salt converted into the free base as shown above, to yield the d-1-phenyl-4-oxo-8-(5-methoxy-2,3-dihydro-2-benzofurylmethyl)-1,3,8-triazaspiro(4,5)decane, melting at 184°–186°, $[\alpha]_D = +12.4°$ (chloroform).

EXAMPLE 6

To the solution of 3 g of either the d,l- or the l-1-phenyl-4-oxo-8-(5-methoxy-2,3-dihydro-2-benzofurylmethyl)-1,3,8-triazaspiro-(4,5)decane in 100 ml of acetone and 30 ml of ethanol, 0.8 ml of methanesulfonic acid are added, followed by 20 ml of water and 200 ml of diethyl ether while stirring. The precipitate formed is filtered off and recrystallized from water, to yield either the d,l- or the l-1-phenyl-4-oxo-8-(5- methoxy-2,3-dihydro-2-benzofurylmethyl)-1,3,8-triazaspiro(4,5)decane methanesulfonate hemihydrate, both melting at 188°–190°.

EXAMPLE 7

The mixture of 6.6 g of 2-bromomethyl-7-methoxy-2,3-dihydrobenzofuran, 6.3 g of 1-phenyl-4-oxo-1,3,8-triazaspiro(4,5)-decane, 12 g of sodium carbonate and 100 ml of 2-propanol is refluxed for 3 days while stirring. After cooling, it is filtered, the filtrate evaporated under reduced pressure and the residue taken up in diethyl ether. The solution is shaken with 5 percent hydrochloric acid, the suspension formed filtered, the precipitate suspended in water and the mixture made basic with aqueous ammonia. It is extracted with chloroform, the extract dried, filtered, evaporated and the residue recrystallized from ethanol, to yield the 1-phenyl-4-oxo-8-(7-methoxy-2,3-dihydro-2-benzofurylmethyl)-1,3,8-triazaspiro(4,5)decane, melting at 170°.

EXAMPLE 8

The mixture of 12.5 g of a 2:1 composition of 2-bromomethyl-4- or 6-methoxy-2,3-dihydrobenzofuran, 12 g of 1-phenyl-4-oxo-1,3,8-triazaspiro(4,5)decane, 25 g of sodium carbonate and 200 ml of 2-propanol is refluxed for 3 days while stirring. After cooling, it is filtered, the filtrate evaporated and the residue taken up in diethyl ether. The solution is shaken with 5 percent hydrochloric acid, the aqueous solution made basic with ammonia and extracted with diethyl ether. The extract is dried, evaporated and the residue chromatographed on silica gel. The column is eluted with benzenemethanol (9:1), to yield a first eluate containing the 1-phenyl-4-oxo-8-(4-methoxy-2,3-dihydro-2-benzofurylmethyl)-1,3,8-triazaspiro-(4,5)decane, showing in the I.R. spectrum bands at 3193, 1695, 1590, 1195, 804, 749 and 690 cm$^{-1}$, followed by the 1-phenyl-4-oxo-8-(6-methoxy-2,3-dihydro-2-benzofurylmethyl)-1,3,8-triazaspiro-(4,5)decane, having a similar I.R. spectrum, but the band at 804 cm$^{-1}$ is missing, whereas a new band at 785 cm$^{-1}$ appears. Both isomers have in the thin layer chromatogram on silica gel with the same eluent a $R_{cm} = 6.0$ and 7.0 respectively.

The starting material is prepared as follows: The mixture of 100 g of 3-methoxyphenol, 70 ml of allyl bromide, 120 g of potassium carbonate and 200 ml of acetone is refluxed for 8 hours while stirring. It is diluted with water and extracted with 500 ml of diethyl ether. The extract is washed with 5 percent aqueous sodium hydroxide and water, dried and evaporated, to yield the 3-allyloxy-anisole.

It is taken up in 200 ml of N,N-dimethylaniline and the mixture refluxed for 2 hours. After cooling, the mixture is poured onto crushed ice and acidified with hydrochloric acid. It is extracted with diethyl ether, the extract washed with water and shaken with 5 percent aqueous sodium hydroxide. The aqueous layer is acidified with hydrochloric acid and extracted with diethyl ether. The extract is dried, evaporated and the residue refluxed with 125 ml of acetic anhydride for 3 hours. The mixture is evaporated under reduced pressure, the residue distilled and the fraction boiling at 156°–158°/15 mmHg collected, to yield a 2:1 mixture of 3-acetoxy-4-allylanisole and 3-acetoxy-2-allylanisole.

To the solution of 53 g thereof in 150 ml of carbon tetrachloride, 41 g of bromine in 50 ml of carbon tetrachloride are added dropwise during 1 hour while stirring and keeping the temperature below 25°. The mixture is washed with aqueous sodium bicarbonate, dried and evaporated. The residue is taken up in 75 ml of ethanol and to the solution that of 14.5 g of sodium methoxide in 50 ml of ethanol is added during 1/2 hour while stirring. The mixture is refluxed for 1 hour, cooled, filtered, and the filtrate concentrated under reduced pressure. The concentrate is diluted with water, extracted with chloroform, the extract dried and evaporated, to yield a 2:1 mixture of the 2-bromomethyl-4- or 6-methoxy-2,3-dihydrobenzofuran, which is used as such without further purification.

EXAMPLE 9

The mixture of 3.1 g of 2-bromomethyl-2-methyl-5-methoxy-2,3-dihydrobenzofuran, 2.9 g of 1-phenyl-4-oxo-1,3,8-triazaspiro-(4,5)decane, 6 g of sodium carbonate and 50 ml of 4-methyl-2-pentanone is refluxed for 1 week while stirring. It is cooled, filtered, and the filtrate washed with water and 5 percent hydrochloric acid. The combined aqueous solutions are made basic with ammonia and extracted with chloroform. The extract is dried, evaporated under reduced pressure, and the residue chromatographed on silica gel. The column is eluted with chloroform-diethylamine 9:1, to yield the 1-phenyl-4-oxo-8-(5-methoxy-2-methyl-2,3-dihydro-2-benzofurylmethyl)-1,3,8-triazaspiro(4,5)decane, showing in the thin layer chromatogram with the same stationary and mobile phase a $R_{cm} = 6.0$. The hydrochloride thereof melts at 280°–282° (dec.).

The starting material is prepared as follows: The mixture of 100 g of 4-methoxyphenol, 73 g of 3-chloro-2-methylpropene, 117 g of potassium carbonate and 200 ml of acetone is refluxed for 12 hours while stirring. After cooling, it is diluted with water and extracted with diethyl ether. The extract is washed with 5 percent aqueous sodium hydroxide, dried and evaporated under reduced pressure, to yield the 4-methallyloxyanisole.

It is diluted with an equal volume of N,N-dimethylaniline and the mixture refluxed for 6 hours. After cooling, it is poured onto ice and the mixture acidified with hydrochloric acid. It is extracted with diethyl ether, the extract washed with water, dried and evaporated under reduced pressure. The residue is taken up in petroleum ether and the mixture extracted with a solution prepared from 35 g of potassium hydroxide, 25 ml of water and 100 ml of methanol. The aqueous phase is diluted with water, acidified with hydrochloric acid, extracted with diethyl ether, the extract dried and evaporated, to yield the 2-methallyl-4-methoxyphenol.

66 g thereof are added to the solution of 122 g of mercuric chloride in 1.3 lt. of water, and the mixture stirred at room temperature overnight. It is filtered and the residue recrystallized from ethanol, to yield the 5-methoxy-2-methyl-2,3-dihydro-2-benzofurylmethyl-mercuric chloride, melting at 70°. To the suspension of 44.5 g thereof in 150 ml carbon tetrachloride, the solution of 5.75 ml of bromine in 50 ml of carbon tetrachloride is added dropwise while stirring at 0°–5°. After 6 hours, the mixture is filtered and the filtrate evaporated, to yield the 2-bromomethyl-2-methyl-5-methoxy-2,3-dihydrobenzofuran.

EXAMPLE 10

The mixture of 1 g of 1-phenyl-4-oxo-8-(5-methoxy-2,3-dihydro-2-benzofurylmethyl)-1,3,8-triazaspiro(4,5)dec-2-ene, 0.1 g of 10 percent palladium on charcoal and 50 ml of glacial acetic acid is hydrogenated at room temperature and 2.7 atm. until the theoretical amount of hydrogen has been absorbed. It is filtered, the filtrate concentrated under reduced pressure, the concentrate diluted with water and made basic with ammonia. The precipitate formed is filtered off and recrystallized from ethanol, to yield the 1-phenyl-4-oxo-8-(5-methoxy-2,3-dihydro-2-benzofurylmethyl)-1,3,8-triazasiro(4,5)decane, melting at 191°–192°; it is identical with that obtained according to Example 1.

The same compound can also be obtained by the analogous reduction of the 1-phenyl-4-oxo-8-(5-methoxy-2-benzofurylmethyl)-1,3,8-triazaspiro(4,5)decane.

The starting material is prepared as follows:

a. The mixture of 6 g of 1-benzyl-4-phenylamino-hexahydroisonicotinamide, 2 g of 10 percent palladium on charcoal, 90 ml of glacial acetic acid and 10 ml of water are hydrogenated at 2.7 atm. and 60° until the theoretical amount of hydrogen has been absorbed. It is filtered, the filtrate evaporated under reduced pressure and the residue taken up in water. The mixture is made basic with ammonia, extracted with chloroform, the extract dried and evaporated. The residue is recrystallized from ethanol, to yield the 4-phenyl-amino-hexahydroisonicotinamide, melting at 209°–210°.

The mixture of 1.9 g thereof, 2.1 g of 2-bromomethyl-5-methoxy-2,3-dihydrobenzofuran, 4 g of sodium carbonate and 200 ml of 2-propanol is refluxed for 4 days, cooled, filtered and the filtrate evaporated under reduced pressure. The residue is taken up in a mixture of 50 ml of diethyl ether and 50 ml of water and the precipitate formed on standing filtered off. It is recrystallized from ethanol, to yield the 1-(5-methoxy-2,3-dihydro-2-benzofurylmethyl)-4-phenylamino-hexahydroisonicotinamide, melting at 150°. The mixture of 2 g thereof, 100 ml of trimethyl orthoformate and 25 mg of p-toluenesulfonic acid is refluxed for 24 hours in a Soxhlet apparatus, passing the condensate over a molecular sieve removing methanol. The mixture is evaporated and the residue triturated with a small amount of methanol, to yield the 1-phenyl-4-oxo-8-(5-methoxy-2,3-dihydro-2-benzofurylmethyl)-1,3,8-triazaspiro(4,5)dec-2-ene.

b. To the solution of 17.7 g of 6-methoxycoumarin in 60 ml of chloroform, 5.5 ml bromine in 10 ml of chloroform are added dropwise while stirring at room temperature. After stirring overnight, 20 ml of 20 percent aqueous sodium sulfite are added dropwise, the organic phase separated and the aqueous layer washed with chloroform. The combined organic phase is washed with water, dried, filtered and evaporated under reduced pressure, to yield the 3,4-dibromo-6-methoxy-3,4-dihydrocoumarin.

The solution of 27.3 g thereof in 20 ml of ethanol is added portionwise to the mixture of 50 g potassium hydroxide and 75 ml of ethanol while stirring at about 15°. The mixture is refluxed for 2½ hours, concentrated and the concentrate diluted with water. It is acidified with 6N hydrochloric acid, the precipitate formed filtered off, washed with water, recrystallized first from aqueous ethanol and then from ethanol, to yield the 5-methoxy-2-benzofurancarboxylic acid, melting at 174°–178°.

The solution of 3.7 g thereof in 50 ml of tetrahydrofuran and 50 ml of diethyl ether is added to the suspension of 1.8 g of lithium aluminum hydride in 25 ml of diethyl ether while stirring at room temperature. After stirring overnight, 1.8 ml of water, 3.6 ml of 12 percent aqueous sodium hydroxide and 5.4 ml of water are added, the mixture filtered and the filtrate evaporated under reduced pressure. The residue is taken up in diethyl ether, the solution washed with saturated aqueous sodium bicarbonate and water, dried and evaporated, to yield the 2-hydroxymethyl-5-methoxybenzofuran, showing in the I.R. spectrum bands at 3250, 1600, 1205, 1160, 1010 and 805 cm$^{-1}$.

To the solution of 1.5 g thereof in 50 ml of diethyl ether, 0.28 ml of phosphorus tribromide are added during 5 minutes while stirring at −70°. The mixture is allowed to warm to room temperature and stirred for 3 hours. It is poured over ice, the organic phase washed with saturated aqueous sodium bicarbonate and water, dried and evaporated, to yield the 2-bromomethyl-5-methoxybenzofuran.

The mixture of 3.8 g thereof, 3.6 g of 1-phenyl-4-oxo-1,3,8-triazaspiro(4,5)decane, 2 g of sodium carbonate and 210 ml of 4-methyl-2-pentanone is refluxed for 3 days while stirring. After cooling, it is filtered, the filtrate washed with water and shaken with 5 percent hydrochloric acid. The precipitate formed is filtered off and washed with water, to yield the 1-phenyl-4-oxo-8-(5-methoxy-2-benzofurylmethyl)-1,3,8-triazaspiro(4,5)decane hydrochloride, melting at 260°–265°. It is taken up in water, the mixture made basic with ammonia, extracted with diethyl ether and the extract evaporated, to yield the corresponding free base.

EXAMPLE 11

The mixture of 6 g of 1-(5-methoxy-2,3-dihydro-2-benzofurylmethyl)-4-phenylamino-hexahydroisonicotinamide and 20 ml of formamide is heated to 170° for 12 hours, cooled and diluted with 100 ml of water. The mixture is extracted twice with 50 ml of chloroform, the extract dried and evaporated under reduced pressure. The residue is recrystallized from ethanol, to yield the 8-(5-methoxy-2,3-dihydro-2-benzofurylmethyl)-1,3,8-triazaspiro(4,5)decane melting to 190°–192°; it is identical with that obtained according to Example 1.

EXAMPLE 12

The mixture of 15.5 g of 2-bromomethyl-5-methoxy-2,3-dihydrobenzofuran, 10 g of 4-oxo-1,3,8-triazaspiro(4,5)decane, 20 g of sodium carbonate and 100 ml of isopropanol is refluxed for 3 days while stirring. It is cooled, filtered and the filtrate evaporated under reduced pressure. The residue is taken up in methylene chloride and the solution extracted with 5 percent methane sulfonic acid. The aqueous phase is made basic with ammonia and extracted with chloroform. The extract is dried and evaporated, to yield the 4-oxo-8-(5-methoxy-2,3-dihydro-2-benzofurylmethyl)-1,3,8-triazaspiro(4,5)decane, showing in the I.R. spectrum bands at 3158, 1700, 1600 and 1204 cm$^{-1}$.

The starting material is prepared as follows: To the mixture of 38 g of 1-benzyl-4-piperidone, 15.5 g of ammonium acetate and 120 ml of acetic acid, the solution of 14.3 g of potassium cyanide in 40 ml of water is added while stirring at 45°. After stirring for 24 hours at room temperature, the mixture is poured onto 200 g of ice and 260 ml of saturated aqueous ammonia. It is extracted with chloroform, the extract dried and evaporated, to yield the 4-amino-1-benzyl-hexahydroisonicotinonitrile.

The mixture of 10 g thereof and 100 ml of 80 percent sulfuric acid is heated to 70° for 10 minutes while stirring. It is cooled, made basic with ammonia and extracted with chloroform. The extract is dried and evaporated, to yield the 4-amino-1-benzyl-hexahydro-isonicotinamide.

The mixture of 20 g thereof and 60 ml of formamide is heated to 170° for 12 hours while stirring. After cooling, it is poured into 300 ml of water and the mixture extracted with chloroform. The extract is dried and evaporated, to yield the 8-benzyl-4-oxo-1,3,8-triazaspiro(4,5)decane.

20 g thereof are dissolved in 200 ml of 90 percent acetic acid and the solution hydrogenated at 55° over 5 g of 10 percent palladium on charcoal until the theoretical amount of hydrogen has been absorbed. It is filtered, the filtrate evaporated and the residue taken up in 30 ml of water. The solution is made basic with ammonia, extracted with chloroform, the extract dried and evaporated, to yield the 4-oxo-1,3,9-triazaspiro(4,5)decane.

EXAMPLE 13

To the solution of 0.668 g of $l$-2-(tosyloxymethyl)-5-methoxy-2,3-dihydrobenzofuran in 5 ml of dimethylformamide, 0.475 g of 1-phenyl-4-oxo-1,3,8-triazaspiro(4,5)decane and 0.15 g sodium carbonate are added and the mixture stirred for six hours at 110°. It is cooled, diluted with water and filtered two hours thereafter, the residue dried and recrystallized from benzene, to yield the $l$-1-phenyl-4-oxo-8-(5-methoxy-2,3-dihydro-2-benzofurylmethyl)-1,3,8-triazaspiro(4,5)decane melting at 188°–190°, $[\alpha]_D = -11.9°$ (chloroform); it is identical with that obtained according to Example 5.

The starting material is prepared as follows: To the solution of 0.97 g of d,$l$-5-methoxy-2,3-dihydro-2-benzofurancarboxylic acid in 50 ml of diethyl ether, 0.7 g of $l$-amphetamine are added while stirring. The precipitate formed is filtered off and washed with diethyl ether, to yield the corresponding salt melting at 134°–142°. It is taken up in 125 ml of hot acetone and the solution allowed to cool to room temperature during 2 ½ hours. The precipitate formed is filtered off, washed with acetone and again dissolved in 60 ml of hot acetone. The precipitate formed after three hours cooling is again filtered off, to yield the corresponding d-salt melting at 153°–162°.

All the mother liquors obtained are concentrated to a volume of 60 ml and the solution allowed to cool to room temperature for three hours. The precipitate formed is filtered off and recrystallized once from acetone, to yield the corresponding $l$-salt melting at 150°–165°.

Both salts obtained are taken up in the minimum amount of 6N hydrochloric acid and the solution obtained extracted with diethyl ether. The extract is washed with water and saturated aqueous sodium chloride, dried and evaporated, to yield the:

a. d-5-methoxy-2,3-dihydro-2-benzofurancarboxylic acid, $[\alpha]_D = +37°$ (chloroform)

b. the $l$-antipode thereof, $[\alpha]_D = -38°$ (chloroform).

To the solution of 0.68 g of said d-acid in 25 ml of tetrahydrofuran, 0.15 g of lithium aluminum hydride is added and the mixture refluxed for one hour. After cooling 0.15 ml of water, 0.3 ml of 12 percent aqueous sodium hydroxide and 0.45 ml of water are added, the mixture filtered and the filtrate evaporated under reduced pressure. The residue is taken up in benzene, the solution filtered and the filtrate evaporated under reduced pressure, to yield the $l$-2-hydroxymethyl-5-methoxy-2,3-dihydrobenzofuran, $[\alpha]_D = -49°$ (chloroform).

Analogously, the $l$-acid is reduced to yield the corresponding d-alcohol, $[\alpha]_D = +45°$ (chloroform).

To the solution of 0.5 g of said $l$-alcohol in 5 ml of pyridine, 0.75 g of p-toluenesulfonyl chloride are added and the mixture stirred overnight at room temperature. Thereupon 5 ml of water are added and the mixture stirred for 10 minutes. It is further diluted with water, extracted with benzene, the extract washed with 5N hydrochloric acid, water and saturated aqueous sodium chloride, dried, evaporated under reduced pressure and the residue triturated with diethyl ether, to yield the $l$-2-(tosyloxymethyl)-5-methoxy-2,3-dihydrobenzofuran melting at 80°–81°.

EXAMPLE 14

The mixture of 10 g of 1-phenyl-5-bis-(2-tosyloxyethyl)-2,3-dihydro-4-imidazolone, 3,2 g of 2-aminomethyl-5-acetyl-2,3-dihydrobenzofuran, 20 g of sodium carbonate and 50 ml of isopropanol is refluxed for three days while stirring. It is filtered hot, the filtrate evaporated under reduced pressure and the residue stirred with a mixture of 50 ml of water and 50 ml of diethyl ether. The precipitate formed is filtered off and recrystallized from acetone, to yield the 1-phenyl-4-oxo-8-(5-acetyl-2,3-dihydro-2-benzofurylmethyl)-1,3,8-triazaspiro(4,5)decane, melting at 166°–168°.

The starting material is prepared as follows: To the stirred solution of 20 g of 1,5-dihydroxy-3-pentanone and 15.8 g of aniline in 70 ml of acetic acid, the solution of 11.1 g of potassium cyanide in 30 ml of water is added dropwise while stirring at 45°. After allowing the mixture to stand for one day at room temperature, it is poured over 100 g of ice and extracted with chloroform. The extract is dried and evaporated, to yield the $\alpha$-phenylamino-$\alpha$-(2-hydroxyethyl)-$\gamma$-hydroxybutyronitrile.

The mixture of 20 g thereof and 90 g of 80 percent sulfuric acid is heated to 70° for 10 minutes and poured onto ice. The mixtured is made basic with ammonia, extracted with chloroform, the extract dried and evaporated, to yield the corresponding amide.

The mixture of 30 g thereof and 60 ml of formamide is stirred at 170° for 12 hours. After cooling it is diluted with water, extracted with chloroform, the extract dried and evaporated. The residue is taken up in 100 ml of pyridine, the solution cooled to 5° and 34 g of p-toluenesulfonyl chloride slowly added while stirring at said temperature. After stirring overnight at room temperature,300 ml of water are added slowly and the mixture extracted with chloroform. The extract is washed with 5 percent hydrochloric acid and water, dried and evaporated under reduced pressure, to yield the 1- phenyl-5-bis-(2-tosyloxyethyl)-2,3-dihydro-4-imidazolone.

EXAMPLE 15

The mixture of 13.2 g of 2-bromomethyl-5-methoxy-2,3-dihydrobenzofuran, 10 g of 3-methyl-2,4-dioxo-1,3,8-triazaspiro-(4,5)decane, 20 g of sodium carbonate and 200 ml of isopropanol is refluxed for three days while stirring. It is filtered hot, the filtrate evaporated and the residue taken up in methylene chloride. The solution is shaken with 5 percent methanesulfonic acid, the aqueous phase made basic with ammonia and extracted with chloroform. The extract is dried and evaporated, to yield the 3-methyl-2,4-dioxo-8-(5-methoxy-2,3-dihydro-2-benzofurylmethyl)-1,3,8-triazaspiro-(4,5)decane, showing in the I.R.-spectrum bands at 3150, 1780, 1724 and 1600 cm$^{-1}$.

The starting material is prepared as follows: The solution of 20 g of 8-benzyl-3-methyl-2,4-dioxo-1,3,8-triazaspiro(4,5)-decane [Il. Pharmaco, 25, 681 (1970-)] in 200 ml of 90 percent aqueous acetic acid is hydrogenated over 5 g of 10 percent palladium on charcoal at 55°, until the theoretical amount of hydrogen has been absorbed. It is filtered, the filtrate concentrated, the concentrate diluted with water and made basic with ammonia. The mixture is extracted with chloroform, the extract dried and evaporated, to yield the 3-methyl-2,4-dioxo-1,3,8-triazaspiro(4,5)decane.

EXAMPLE 16

The mixture of 10 g of 5-methoxybenzofuran-2-carboxaldehyde and 13 g of 1-phenyl-4-oxo-1,3,8-triazaspiro(4,5)decane, 0.5 ml of acetic acid and 200 ml of ethanol is refluxed for five hours under nitrogen. After cooling, 3 g of 10 percent palladium on charcoal are added and the mixture hydrogenated at 3.3 atm. and 55° until the theoretical amount of hydrogen has been absorbed. It is heated to reflux, the mixture filtered hot, the filtrate slowly cooled and the precipitate formed filtered off, to yield the 1-phenyl-4-oxo-8-(5-methoxy-2,3-dihydro-2-benzofurylmethyl)-1,3,8-triazaspiro(4,5)decane melting at 191°; it is identical with that obtained according to Example 1.

The starting material is prepared as follows: The mixture of 10 g of 2-hydroxymethyl-5-methoxybenzofuran, 10 g of active manganese dioxide and 100 ml of methylene chloride is stirred at room temperature for 24 hours. It is filtered, the residue washed with hot methylene chloride and the combined filtrate evaporated, to yield the 5-methoxybenzofuran-2-carboxaldehyde.

EXAMPLE 17

Preparation of 10,000 tablets each containing 1.0 mg of the active ingredient:

Formula:
| | |
|---|---|
| 1-phenyl-4-oxo-8-(5-methoxy-2,3-dihydro-2-benzofurylmethyl)-1,3,8-triazaspiro (4,5)decane | 10.00 g |
| Lactose | 828.00 g |
| Corn starch | 50.00 g |
| Polyethylene glycol 6,000 | 50.00 g |
| Talcum powder | 50.00 g |
| Magnesium stearate | 12.00 g |
| Purified water | q.s. |

PROCEDURE

All the powders are passed through a screen with openings of 0.6 mm. Then the drug substance, lactose, talcum, magnesium stearate and half of the starch are mixed in a suitable mixer. The other half of the starch is suspended in 25 ml of water and the suspension added to the boiling solution of the polyethylene glycol in 100 ml of water. The paste formed is added to the powders which are granulated, if necessary, with an additional amount of water. The granulate is dried overnight at 35°, broken on a screen with 1.2 mm openings and compressed into tablets using flat punches with 4.8 mm diameter, uppers bisected.

EXAMPLE 18

Preparation of 10,000 tablets each containing 25.0 mg of the active ingredient:

Formula:
| | |
|---|---|
| l-1-phenyl-4-oxo-8-(5-methoxy-2,3-dihydro-2-benzofurylmethyl)-1,3,8-triazaspiro-(4,5)decane methanesulfonate hemihydrate | 250.00 g |
| Lactose | 1,956.00 g |
| Corn starch | 90.00 g |
| Polyethylene glycol 6,000 | 90.00 g |
| Talcum powder | 90.00 g |
| Magnesium stearate | 24.00 g |
| Purified water | q.s. |

PROCEDURE

All the powders are passed through a screen with openings of 0.6 mm. Then the drug substance, lactose, talcum, magnesium stearate and half of the starch are mixed in a suitable mixer. The other half of the starch is suspended in 45 ml of water and the suspension added to the boiling solution of the polyethylene glycol in 180 ml of water. The paste formed is added to the powders which are granulated, if ncessary, with an additional amount of water. The granulate is dried overnight at 35°, broken on a screen with 1.2 mm openings and compressed into tablets using concave punches with 7.1 mm diameter, uppers bisected.

According to the procedure described in this and the preceding example, tablets are prepared, each containing 1 to 25 mg of any compound of the invention, e.g. of those illustrated by the remaining examples herein.

EXAMPLE 19

The solution of 5 g of 2-bromomethyl-5-acetyl-2,3-dihydrobenzofuran in 40 ml of 4-methyl-2-pentanone is added dropwise to the mixture of 4.5 g of 1-phenyl-4-oxo-1,3,8-triazaspiro(4,5)decane, 7.4 g of sodium carbonate, 1 crystal of potassium iodide and 200 ml of 4-methyl-2-pentanone while stirring. The mixture is refluxed 3 days, cooled and filtered. The precipitate is washed with 4-methyl-2-pentanone and water, the filtrate extracted with 5 percent hydrochloric acid and the aqueous solution made basic with ammonia. It is extracted with chloroform, the extract washed with water, dried, evaporated and the residue recrystallized from acetone, to yield the 1-phenyl-4-oxo-8-(5-acetyl-2,3-dihydro-2-benzofurylmethyl)-1,3,8-triazaspiro(4,5)decane, melting at 166°–168°; it is identical with that obtained according to Example 14.

The starting material is prepared as follows: The mixture of 50 g of 4-hydroxyacetophenone, 44.5 g of allylbromide, 51.5 g of potassium carbonate and 80 ml of acetone is refluxed for 8 hours while stirring. After standing overnight at room temperature, it is diluted with 500 ml of water and extracted with diethyl ether. The extract is washed with water, dried, evaporated, the residue distilled and the fraction boiling at 110°–11-

5°/0.7 mmHg collected, to yield the 4-allyloxyacetophenone. 57 g thereof are heated under nitrogen to 230° for 90 minutes, cooled and diluted with 80 ml of acetic anhydride. The mixture is refluxed for 3 hours, evaporated, the residue distilled and the fraction boiling at 122°–128°/0.2 mmHg collected, to yield the 4-acetyl-3-allyl-acetophenone.

To the solution of 52.5 g thereof in 180 ml of carbon disulfide, 38 g of bromine are added dropwise during 3 hours while stirring at −5° to 0°, and the mixture evaporated under reduced pressure, to yield the 1,2-dibromo-3-(2-acetoxy-5-acetylphenyl)-propane.

To the mixture of 100 g thereof and 250 ml of diethyl ether, the solution of 30 g of sodium methoxide in 500 ml of diethyl ether is slowly added while stirring and the mixture refluxed for 2 hours. It is cooled, filtered and the filtrate evaporated under reduced pressure. The residue is taken up in water, the mixture extracted with methylene chloride, the extract washed with water, dried, evaporated, the residue distilled and the fraction boiling at 155°–157°/0.07 mm Hg collected, to yield the 2-bromomethyl-5-acetyl-2,3-dihydrobenzofuran.

EXAMPLE 20

To the solution of 1.8 g of 1-phenyl-4-oxo-8-(5-acetyl-2,3-dihydro-2-benzofurylmethyl)-1,3,8-triazaspiro(4,5)decane in 500 ml of ethanol, 0.45 g of sodium borohydride are added portionwise while stirring at 50°. The mixture is slowly evaporated under reduced pressure, the residue triturated with water, filtered, washed with water and recrystallized from ethanol, to yield the 1-phenyl-4-oxo-8-[5-(1-hydroxyethyl)-2,3-dihydro-2-benzofurylmethyl]-1,3,8-triazaspiro(4,5)decane of the formula

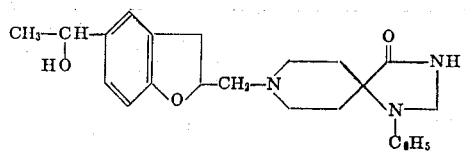

melting at 196°–200°.

EXAMPLE 21

The mixture of 1.97 g of l-2-(d-10-camphorsulfonyloxymethyl)-5-methoxy-2,3-dihydrobenzofuran, 20 ml of dimethylformamide, 1.15 g of 1-phenyl-4-oxo-1,3,8-triazaspiro(4,5)decane, 1.37 g of potassium carbonate and 3 crystals of potassium iodide is refluxed for 15 minutes while stirring. It is evaporated under reduced pressure, the residue is taken up in 100 ml of chloroform, the mixture washed twice with 50 ml of water, dried and evaporated. The residue is recrystallized from 25 ml of hot ethanol, and the precipitate formed after cooling is washed with 10 ml of cold ethanol, to yield the l-1-phenyl-4-oxo-8-(5-methoxy-2,3-dihydro-2-benzofurylmethyl)-1,3,8-triazaspiro(4,5)decane, melting at 188°–190°; it is identical with that obtained according to Examples 5 or 13.

The starting material is prepared as follows: To the solution of 206.5 g of d,l-2-bromomethyl-5-methoxy-2,3-dihydrobenzofuran and 105 g of benzoic acid in 300 ml of dimethylformamide, the suspension of 138.2 g of potassium carbonate in 500 ml of dimethylformamide is added during 14 minutes while stirring. After 12 minutes, the mixture is cooled, filtered and the residue washed twice with 100 ml of dimethylformamide. The filtrate is concentrated, 500 g of ice are added, whereupon crystallization occurs. The precipitate formed is filtered off, washed with water, taken up in 2 lt of diethyl ether, the solution washed with 100 ml each of water, 5 percent aqueous sodium bicarbonate and water, dried and evaporated. The residue is recrystallized from 800 ml of isopropanol and washed with 400 ml ice cold isopropanol, to yield the d,l-2-benzoyloxymethyl-5-methoxy-2,3-dihydrobenzofuran, melting at 67°–68°.

150 g thereof are added to the solution of 43.8 g of potassium hydroxide in 500 ml of anhydrous ethanol and the mixture is refluxed for 75 minutes, during which time 10 ml portions of water are added to keep it homogeneous. It is evaporated under reduced pressure, the residue taken up in 200 ml of water, the mixture concentrated under reduced pressure and the concentrate extracted 5 times with 300 ml of diethyl ether. The extract is dried, evaporated, the residue distilled and the fraction boiling at 108°–110°/0.1 mm Hg collected, to yield the d,l-2-hydroxymethyl-5-methoxy-2,3-dihydrobenzofuran, melting at 42°–43°.

To the solution of 39.08 g thereof in 350 ml of pyridine, 56.13 g of d-10-camphorsulfonylchloride are added during 15 minutes while stirring and keeping the temperature between 18° and 20°. The mixture is allowed to stand overnight at room temperature and is evaporated under reduced pressure. The residue is distributed between 600 ml of methylene chloride and 1.37 lt of 4 percent ice cold hydrochloric acid. The organic phase is separated, washed with water, dried, filtered and evaporated. The residue is recrystallized from 875 ml of methanol and washed twice with 125 ml of methanol. It is again recrystallized from 600 ml boiling methanol, the precipitate formed at room temperature filtered off and washed twice with 125 ml of methanol, to yield the l-2-(d-10-camphorsulfonyloxymethyl)-5-methoxy-2,3-dihydrobenzofuran, melting at 111°–112°, $[\alpha]_D = -20.5°$ (chloroform).

The combined mother liquors are cooled to −15°, the precipitate formed filtered off and washed twice with 125 ml of −15° methanol, to yield d-2-(d-10-camphorsulfonyloxymethyl)-5-methoxy,-2,3-dihydrobenzofuran, melting at 60°–62°, $[\alpha]_D = +65.8°$ (chloroform). It can be converted into d,l-2-hydroxymethyl-5-methoxy-2,3-dihydrobenzofuran as follows.

The mixture of 15.7 g of the undesired, low melting d-camphorsulfonate, 5.49 g of benzoic acid, 13.7 g of potassium carbonate and 100 ml of dimethylformamide is refluxed for 30 minutes while stirring. It is evaporated under reduced pressure, the residue taken up in 250 ml of water and the mixture extracted with diethyl ether. The extract is washed with water, dried, evaporated and the residue recrystallized from diisopropyl ether, to yield the d-2-benzoyloxymethyl-5-methoxy-2,3-dihydrobenzofuran, melting at 62°–68°.

9.39 g thereof are added to the solution of 3.36 g of potassium hydroxide in 50 ml of ethanol and 10 ml of water and the mixture refluxed for 3 hours. It is evaporated under reduced pressure, the residue taken up in water and the mixture extracted with diethyl ether. The extract is dried, filtered, evaporated, the residue distilled and the fraction boiling at 114°–116°/0.18 mm Hg collected, to yield the d-2-hydroxymethyl-5-methoxy-2,3-dihydrobenzofuran, $[\alpha]_D = +41.7°$ (chloroform).

The mixture of 2.5 g thereof, 50 ml of dry toluene and 25 mg of sodium is refluxed until the sodium is consumed. Thereupon the solution of 90 mg of 9-fluorenone in 1.5 ml of toluene is added and the mixture refluxed for 28 hours. It is cooled, washed with water, dried, evaporated, the residue distilled and the fraction boiling at 114°–116°/0.18 mm Hg collected, to yield the almost racemic 2-hydroxymethyl-5-methoxy-2,3-dihydrobenzofuran, $[\alpha]_D = +13.4°$ (chloroform).

Said intermediate can also be prepared as follows: Through the stirred mixture of 12.4 g 4-methoxyphenol, 13.03 g of α-chloroacrylonitrile and 13.63 g of zinc chloride, hydrogen chloride is bubbled while keeping the temperature at about 40° for 2 hours. The mixture is allowed to cool to room temperature, 4.5 g of 60-chloroacrylonitrile are added while stirring and the mixture allowed to stand overnight at room temperature. Thereupon 80 ml of water and 250 ml of methylene chloride are added while stirring, the organic solution separated, dried and evaporated. The residue is taken up in the solution of 20 g of potassium hydroxide, 50 ml of water and 50 ml of ethanol and the mixture refluxed overnight. After cooling, it is acidified with concentrated hydrochloric acid and evaporated under reduced pressure. The residue is taken up in 150 ml of water, the mixture extracted with chloroform, the extract dried, evaporated and the residue recrystallized from chloroform, to yield the d,l-5-methoxy-2,3-dihydro-2-benzofurancarboxylic acid, melting at 98°–100°. It can be reduced to the corresponding alcohol as shown in Example 13.

Instead of treating the resulting condensation product, i.e. the 3-chloro-6-methoxy-3,4-dihydrocoumarin, with potassium hydroxide, it is taken up in the minimum amount of dioxane, the solution slowly added to 75 ml of concentrated aqueous ammonia while stirring at 10°, the mixture stirred at room temperature for about 2 hours and filtered, to yield the d,l-5-methoxy-2,3-dihydro-2-benzofurancarboxamide. It is analogously reduced with lithium aluminum hydride, to yield the d,l-2-aminomethyl-5-methoxy-2,3-dihydrobenzofuran.

EXAMPLE 22

Preparation of 10,000 capsules each containing 10 mg of the active ingredient:

Formula:
| | |
|---|---|
| 1-phenyl-4-oxo-8-[5-(1-hydroxyethyl)-2,3-dihydro-2-benzofurylmethyl]-1,3,8-triazaspiro(4,5)decane | 100.0 g |
| Lactose | 1,800.0 g |
| Talcum powder | 100.0 g |

PROCEDURE

All the powders are passed through a screen with openings of 0.6 mm. Then the drug substance is placed in a suitable mixer and mixed first with the talcum, then with the lactose until homogenous. No. 3 capsules are filled with 200 mg, using a capsule filling machine.

I claim:

1. An 8-[1-(2,3-dihydro-2-benzofuryl)-alkyl]-1,3,8-triazaspiro(4,5)decane corresponding to the formula

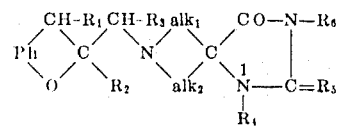

wherein Ph is 1,2-phenylene, (lower alkyl)-1,2-phenylene, mono- or di-(lower alkoxy)-1,2-phenylene, (lower alkylenedioxy)-1,2-phenylene, (fluoro or chloro)-1,2-phenylene, (lower α-hydroxyalkyl)-1,2-phenylene or (lower alkanoyl)-1,2-phenylene, each of $R_1$, $R_2$ and $R_3$ is hydrogen or lower alkyl, each of $alk_1$ and $alk_2$ is lower alkylene separating the nitrogen atom from the spiro-carbon atom by two ring-carbon atoms, $R_4$ is hydrogen, lower alkyl, 3 to 7 ring-membered cycloalkyl or H-Ph, $R_5$ is two hydrogens or oxo, and $R_6$ is hydrogen, or a lower alkanoyl derivative of said compounds in which $R_4$ and/or $R_6$ is hydrogen, the N-oxide or therapeutically acceptable acid addition salts thereof.

2. A compound as claimed in claim 1 and corresponding to the formula

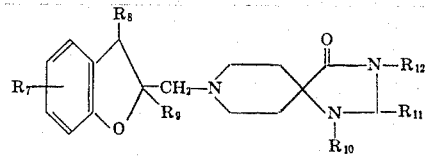

in which $R_7$ is hydrogen, lower alkyl, lower alkoxy, fluoro, chloro, lower α-hydroxyalkyl, or lower alkanoyl, each of $R_8$, $R_9$ and $R_{11}$ is hydrogen or lower alkyl, $R_{10}$ is lower alkyl, 3 to 7 ring-membered cycloalkyl or $R_7$-phenyl, and $R_{12}$ is hydrogen or lower alkanoyl, or therapeutically acceptable acid addition salts thereof.

3. A compound as claimed in claim 2, in which formula $R_7$ is hydrogen, alkyl, alkoxy, fluoro, chloro, α-hydroxyalkyl, or alkanoyl, each of $R_8$, $R_9$ and $R_{11}$ is hydrogen or and $R_{10}$ is methyl, cyclohexyl or $R_7$-phenyl, $R_{12}$ is hydrogen, methyl, or acetyl, and alkyl, alkoxy or alkanoyl contains up to 4 carbon atoms, or therapeutically acceptable acid addition salts thereof.

4. A compound as claimed in claim 2, in which formula $R_7$ is hydrogen, methyl, methoxy, fluoro, chloro, 1-hydroxyethyl, or acetyl, each of $R_8$, $R_9$ and $R_{11}$ is hydrogen or methyl, $R_{10}$ is $R_7$-phenyl and $R_{12}$ is hydrogen or a therapeutically acceptable acid addition salt thereof.

5. A compound as claimed in claim 2 and being the 1-phenyl-4-oxo-8-(5-methoxy-2,3-dihydro-2-benzofurylmethyl)-1,3,8-triazaspiro(4,5)decane or a therapeutically acceptable acid addition salt thereof.

6. A compound as claimed in claim 2 and being the 1-phenyl-4-oxo-8-[5-(1-hydroxyethyl)-2,3-dihydro-2-benzofurylmethyl]-1,3,8-triazaspiro(4,5)decane or a therapeutically acceptable acid addition salt thereof.

7. A compound as claimed in claim 4 and being in the isolated optically levorotatory form thereof.

* * * * *